United States Patent
Noh et al.

(10) Patent No.: US 11,368,201 B2
(45) Date of Patent: Jun. 21, 2022

(54) METHOD FOR GROUPCAST TRANSMISSION AND RECEPTION WITH FEEDBACK INFORMATION, AND APPARATUS THEREFOR

(71) Applicant: Electronics and Telecommunications Research Institute, Daejeon (KR)

(72) Inventors: Go San Noh, Daejeon (KR); Il Gyu Kim, Chungcheongbuk-do (KR); Jun Hyeong Kim, Daejeon (KR); Ju Ho Park, Daejeon (KR); Jung Hoon Lee, Daejeon (KR); Jun Hwan Lee, Seoul (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 16/579,924

(22) Filed: Sep. 24, 2019

(65) Prior Publication Data
US 2020/0106500 A1    Apr. 2, 2020

(30) Foreign Application Priority Data

Sep. 28, 2018  (KR) .......... 10-2018-0116100
Jun. 5, 2019   (KR) .......... 10-2019-0066769
Sep. 19, 2019  (KR) .......... 10-2019-0115579

(51) Int. Cl.
*H04B 7/06*   (2006.01)
*H04W 72/04*  (2009.01)
(Continued)

(52) U.S. Cl.
CPC ......... *H04B 7/0621* (2013.01); *H04L 5/0048* (2013.01); *H04L 5/0055* (2013.01);
(Continued)

(58) Field of Classification Search
CPC ... H04B 7/0621; H04L 5/0048; H04L 5/0055; H04L 5/0057; H04L 27/2601; H04L 41/0893; H04W 52/30; H04W 72/042
See application file for complete search history.

(56) References Cited

U.S. PATENT DOCUMENTS 8,995,365 B2    3/2015  Zeira et al.
9,706,524 B2    7/2017  Park et al.
(Continued)

FOREIGN PATENT DOCUMENTS

KR    10-1468701 B1    12/2014
KR    10-1862619 B1    5/2018

*Primary Examiner* — Christopher M Crutchfield
*Assistant Examiner* — Tito Q Pham
(74) *Attorney, Agent, or Firm* — Rabin & Berdo, P.C.

(57) ABSTRACT

A method for sidelink groupcast transmission, performed by a transmitting terminal, may comprise configuring a first feedback resource located at a first time point and a second feedback resource located at a later time point than the first time point; transmitting groupcast control information and groupcast data to a receiving terminal group; receiving first feedback information through the first feedback resource from at least one terminal belonging to a first subgroup of the receiving terminal group; and receiving second feedback information through the second feedback resource from at least one terminal belonging to a second subgroup of the receiving terminal group.

12 Claims, 8 Drawing Sheets

(51) Int. Cl.
*H04W 52/30* (2009.01)
*H04L 41/0893* (2022.01)
*H04L 27/26* (2006.01)
*H04L 5/00* (2006.01)

(52) U.S. Cl.
CPC ........ *H04L 5/0057* (2013.01); *H04L 27/2601* (2013.01); *H04L 41/0893* (2013.01); *H04W 52/30* (2013.01); *H04W 72/042* (2013.01)

(56) References Cited

U.S. PATENT DOCUMENTS

| | | | |
|---|---|---|---|
| 10,057,888 B2 | 8/2018 | Cave et al. | |
| 10,931,426 B2* | 2/2021 | Desai | H04W 72/0446 |
| 2002/0065928 A1* | 5/2002 | Senga | H04L 65/4076 |
| | | | 709/231 |
| 2009/0286468 A1 | 11/2009 | Kim et al. | |
| 2010/0110960 A1 | 5/2010 | Kim et al. | |
| 2018/0014163 A1 | 1/2018 | Herrmann | |
| 2019/0007974 A1* | 1/2019 | Nguyen | H04W 4/44 |
| 2019/0052436 A1* | 2/2019 | Desai | H04L 1/1861 |
| 2020/0099479 A1* | 3/2020 | Park | H04L 1/1896 |
| 2020/0154404 A1* | 5/2020 | Goktepe | H04W 72/04 |
| 2020/0296796 A1* | 9/2020 | Uchiyama | H04W 28/26 |
| 2021/0037603 A1* | 2/2021 | Li | H04L 5/0048 |
| 2021/0194647 A1* | 6/2021 | Zhao | H04W 76/11 |
| 2021/0243841 A1* | 8/2021 | Yasukawa | H04W 28/04 |
| 2021/0297199 A1* | 9/2021 | Miao | H04L 1/189 |

* cited by examiner

METHOD FOR GROUPCAST TRANSMISSION AND RECEPTION WITH FEEDBACK INFORMATION, AND APPARATUS THEREFOR

CROSS-REFERENCE TO RELATED APPLICATIONS

This application claims priority to Korean Patent Applications No. 10-2018-0116100 filed on Sep. 28, 2018, No. 10-2019-0066769 filed on Jun. 5, 2019, and No. 10-2019-0115579 filed on Sep. 19, 2019 in the Korean Intellectual Property Office (KIPO), the entire contents of which are hereby incorporated by reference.

BACKGROUND

1. Technical Field

The present disclosure relates to a method for groupcast transmission and reception in a wireless communication system, and more particularly, to a method for resource allocation and scheduling for groupcast feedback, a terminal apparatus using the same, and a base station apparatus using the same.

2. Related Art

A cell of a cellular wireless communication network comprises one base station and one or more terminals. The base station may be configured with one or multiple transmission reception points (TRPs). Information from the base station to the terminal is transmitted through downlink, and information from the terminal to the base station is transmitted through uplink. Sidelink is used for transmission of information between terminals located in the same cell or in different cells.

The sidelink transmission scheme may be classified into unicast, broadcast, and groupcast according to a scheme of connecting a transmitting terminal and at least one receiving terminal.

The groupcast means transmission of a common message or a common data packet from one terminal to a specific group of receiving terminals. Since the groupcast assumes a predetermined specific receiving terminal group, HARQ retransmission or link adaptation may be applied to the corresponding receiving terminal group.

In case of the groupcast, since feedback information have to be transmitted from a plurality of terminals, signaling overhead may occur. In particular, a solution for resource allocation and scheduling for conveying feedback information, which is different from that of the conventional unicast, is required.

SUMMARY

Accordingly, exemplary embodiments of the present disclosure provide a method for performing sidelink groupcast transmission, which is performed by a sidelink transmitting terminal.

Accordingly, exemplary embodiments of the present disclosure also provide a method for performing sidelink groupcast reception, which is performed by a sidelink receiving terminal.

Accordingly, exemplary embodiments of the present disclosure also provide a method for supporting sidelink groupcast feedback, which is performed by a base station.

According to exemplary embodiments of the present disclosure, a method for sidelink groupcast transmission, performed by a transmitting terminal, may comprise configuring a first feedback resource located at a first time point and a second feedback resource located at a later time point than the first time point; transmitting groupcast control information and groupcast data to a receiving terminal group; receiving first feedback information through the first feedback resource from at least one terminal belonging to a first subgroup of the receiving terminal group; and receiving second feedback information through the second feedback resource from at least one terminal belonging to a second subgroup of the receiving terminal group.

Information on the first feedback resource may be transmitted from the transmitting terminal to terminals belonging to the first subgroup and the second subgroup through a physical sidelink control channel (PSCCH) or a physical sidelink shared channel (PSSCH), or transmitted from a serving base station of terminals belonging to the first subgroup or the second subgroup to the terminals belonging to the first subgroup and the second subgroup through a downlink control information (DCI).

Information on a scrambling sequence or a demodulation reference signal (DM-RS) sequence, which is required for demodulating the first feedback information, may be transmitted from the transmitting terminal to terminals belonging to the second subgroup through a PSCCH or a PSSCH, or transmitted from a serving base station of the terminals belonging to the first subgroup or the second subgroup to the terminals belonging to the second subgroup through a DCI.

The at least one terminal transmitting the second feedback information may be a portion of terminals belonging to the second subgroup.

When the first feedback information includes a negative acknowledgement (NACK), a terminal to transmit an ACK or a NACK may not transmit the second feedback information through the second feedback resource.

When the first feedback information includes a channel quality indicator (CQI), a terminal to transmit a CQI indicating a modulation and coding scheme (MCS) having a higher or equal level than an MCS indicated by the CQI included in the first feedback information may not transmit the second feedback information through the second feedback resource.

When the first feedback information includes a rank indicator (RI), a terminal to transmit an RI having a higher or equal level than an RI included in the first feedback information may not transmit the second feedback information through the second feedback resource.

When the first feedback information includes a transmit power control (TPC) command instructing to increase a transmission power, a terminal to transmit a TPC command instructing to decrease or maintain the transmission power may not transmit the second feedback information through the second feedback resource.

Furthermore, according to exemplary embodiments of the present disclosure, a method for sidelink groupcast reception, performed by a receiving terminal, may comprise being configured with a first feedback resource located at a first time point and a second feedback resource located at a later time point than the first time point, the first feedback resource being for transmitting first feedback information and the second feedback resource being for transmitting second feedback information; receiving groupcast data from a transmitting terminal; in response to determining that the receiving terminal belongs to a first subgroup of a receiving terminal group, transmitting the first feedback information on the groupcast data through the first feedback resource; and in response to determining that the receiving terminal belongs to a second subgroup of the receiving terminal group, receiving the first feedback information transmitted by at least one terminal belonging to the first subgroup, and determining whether to transmit the second feedback information on the groupcast data through the second feedback resource based on the received first feedback information.

Information on the first feedback resource may be received from the transmitting terminal through a physical sidelink control channel (PSCCH) or a physical sidelink shared channel (PSSCH), or received from a serving base station through a downlink control information (DCI).

Information on a scrambling sequence or a demodulation reference signal (DM-RS) sequence, which is required for demodulating the first feedback information, may be received from the transmitting terminal through a PSCCH or a PSSCH, or received from a serving base station through a DCI.

When the received first feedback information includes a negative acknowledgement (NACK), and the receiving terminal belongs to the second subgroup and is to transmit an ACK or a NACK, the receiving terminal may not transmit the second feedback information through the second feedback resource.

When the received first feedback information includes a channel quality indicator (CQI), and the receiving terminal belongs to the second subgroup and is to transmit a CQI indicating a modulation and coding scheme (MCS) having a higher or equal level than an MCS indicated by the CQI included in the received first feedback information, the receiving terminal may not transmit the second feedback information through the second feedback resource.

When the received first feedback information includes a rank indicator (RI), and the receiving terminal belongs to the second subgroup and is to transmit an RI having a higher or equal level than an RI included in the received first feedback information, the receiving terminal may not transmit the second feedback information through the second feedback resource.

When the received first feedback information includes a transmit power control (TPC) command instructing to increase a transmission power, and the receiving terminal belongs to the second subgroup and is to transmit a TPC instructing to decrease or maintain the transmission power, the receiving terminal may not transmit the second feedback information through the second feedback resource.

Furthermore, according to exemplary embodiments of the present disclosure, a method for supporting sidelink groupcast, performed by a base station, may comprise allocating a first feedback resource located at a first time point and a second feedback resource located at a later time point than the first time point; and transmitting information on the first feedback resource and information on the second feedback resource to at least one of a transmitting terminal for groupcast transmission and at least one receiving terminal belonging to a receiving terminal group of the groupcast transmission.

The first feedback resource may be allocated to a first subgroup of the receiving terminal group, and the second feedback resource may be allocated to a second subgroup of the receiving terminal group.

At least one terminal belonging to the first subgroup may transmit first feedback information to the transmitting terminal through the first feedback resource, and at least one terminal belonging to the second subgroup may transmit second feedback information to the transmitting terminal through the second feedback resource.

The at least one terminal transmitting the second feedback information may be a portion of terminals belonging to the second subgroup.

The method may further comprise transmitting information on a scrambling sequence or a demodulation reference signal (DM-RS) sequence, which is required for demodulating the first feedback information, to terminals belonging to the second subgroup through a downlink control information (DCI).

The groupcast communication method in the wireless communication system according to the exemplary embodiments of the present disclosure can reduce the amount of transmission of groupcast feedback information so as to increase the efficiency of radio resource usage, reduce the power consumption of the terminal, and reduce unnecessary interference.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

In the following description, a wireless communication network to which exemplary embodiments according to the present disclosure are applied will be described. The wireless communication network to which exemplary embodiments according to the present disclosure are applied is not limited to the contents described below, and the exemplary embodiments according to the present disclosure may be applied to various wireless communication networks.

The sidelink may be applied to device-to-device (D2D) communication, vehicle-to-vehicle (V2V) communication, or vehicle-to-pedestrian (V2P) communication. Examples of types of channels transmitted through the sidelink include a physical sidelink control channel (PSCCH) for transmitting sidelink control information and a physical sidelink shared channel (PSSCH) for transmitting sidelink data, and a physical sidelink feedback channel (PSFCH). Also, examples of types of channels transmitted through the sidelink include a physical sidelink broadcast channel (PSBCH) for transmitting sidelink related system information, and a primary sidelink synchronization signal (PSLSS) and a secondary sidelink synchronization signal (SSLSS) which are signals for synchronization. Meanwhile, the sidelink transmission scheme may be classified into a unicast, a broadcast, and a groupcast according to a scheme of connecting a transmitting terminal and at least one receiving terminal.

Figure 1:
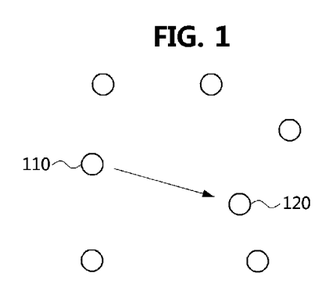
FIG. 1 is a conceptual diagram illustrating unicast sidelink transmission.

FIG. 1 is a conceptual diagram illustrating unicast sidelink transmission.

Referring to FIG. 1, a unicast scheme in sidelink transmission refers to a scheme in which one transmitting terminal 110 transmits a specific message or data packet to another receiving terminal 120. The unicast scheme may be used for general data transfer to a specific user (terminal).

Since the unicast supports only one-to-one communication between the transmitting terminal 110 and the receiving terminal 120, a hybrid automatic repeat request (HARQ) retransmission, link adaptation, etc. for the corresponding link may be applied through a feedback link.

Figure 2:
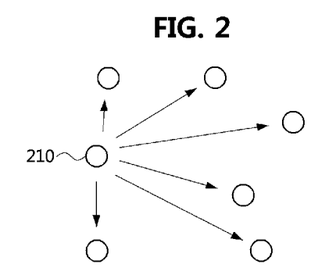
FIG. 2 is a conceptual diagram illustrating broadcast sidelink transmission.

FIG. 2 is a conceptual diagram illustrating broadcast sidelink transmission.

Referring to FIG. 2, a broadcast scheme in sidelink transmission refers to a scheme in which one transmitting terminal 210 transmits a common message or data packet to all terminals existing within a transmission coverage of the transmitting terminal 210.

Examples of the broadcast include safety information transfer to all nearby vehicles in inter-vehicle communication (V2V communication). Since the broadcast generally requires short latency and is applied only to uni-directional communication, HARQ retransmission or link adaptation is not applied.

Figure 3:
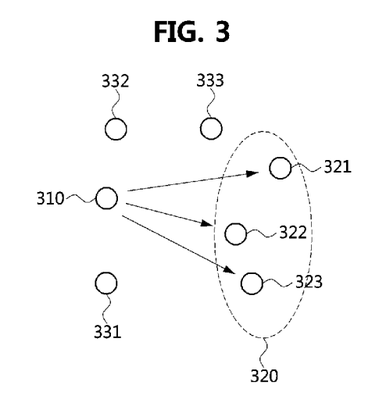
FIG. 3 is a conceptual diagram illustrating groupcast sidelink transmission.

FIG. 3 is a conceptual diagram illustrating groupcast sidelink transmission.

Referring to FIG. 3, a groupcast scheme in sidelink transmission is a scheme in which one transmitting terminal 310 transmits a common message or data packet to a specific receiving terminal group (e.g., a group including a terminal 321, a terminal 322, and a terminal 323). Unlike the broadcast described with reference to FIG. 2, terminals 331, 332, and 333 are within a transmission coverage of the transmitting terminal 310 but may not receive the corresponding message or data packet.

On the other hand, in the case of groupcast, unlike broadcast, HARQ retransmission or link adaptation may be applied to the corresponding receiving terminal group since the predetermined specific receiving terminal group is assumed to be a reception target.

For example, in case of vehicle platooning using V2V communications, the broadcast scheme may be used for communications between terminals belonging to a group performing platooning.

The groupcast transmission and reception method according to exemplary embodiments of the present disclosure, which will be described below, may be applied to sidelink. However, various exemplary embodiments of the present disclosure may be applied not only to sidelink groupcast but also to downlink groupcast from a base station or uplink groupcast to a base station.

Figure 4:
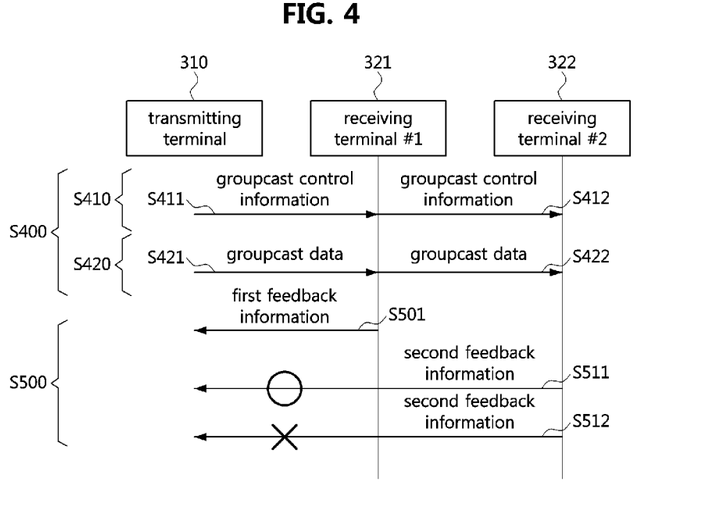
FIG. 4 is a sequence chart illustrating a groupcast transmission method according to an exemplary embodiment of the present disclosure.
Figure 5:
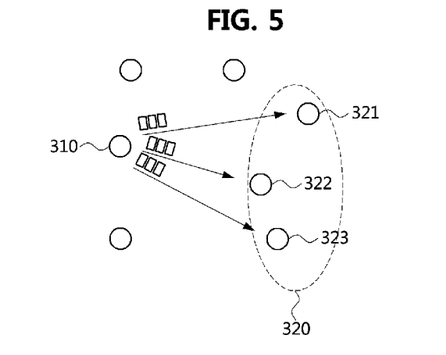
FIGS. 5 to 7 are conceptual diagrams for explaining a groupcast transmission method according to an exemplary embodiment of the present disclosure.
Figure 6:
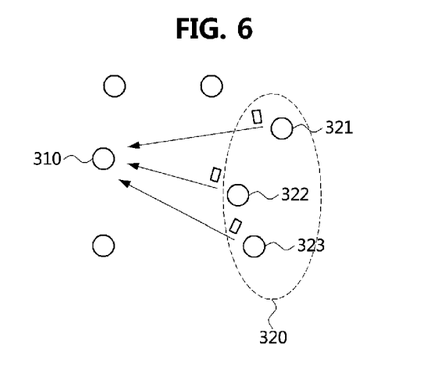
Figure 7:
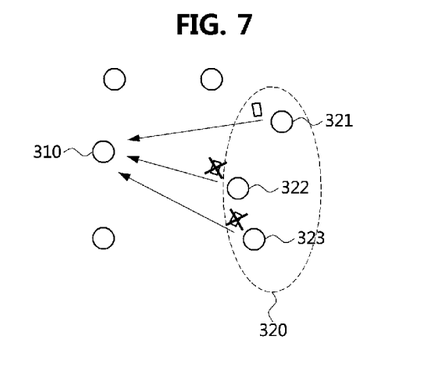

FIG. 4 is a sequence chart illustrating a groupcast transmission method according to an exemplary embodiment of the present disclosure, and FIGS. 5 to 7 are conceptual diagrams for explaining a groupcast transmission method according to an exemplary embodiment of the present disclosure.

Hereinafter, a groupcast transmission method according to an exemplary embodiment of the present disclosure will be described with reference to FIGS. 4 and 5 to 7.

In FIG. 4, a groupcast transmission method according to an exemplary embodiment of the present disclosure will be described on the basis of an operation of a transmitting terminal 310 performing groupcast transmission, but operations of receiving terminals 321 and 321 performing operations corresponding to the operation of the transmitting terminal 310 will be described together. FIG. 4 illustrates only operations of the receiving terminals 321 and 322 belonging to a receiving terminal group 320.

Referring to FIG. 4, a groupcast transmission method according to an exemplary embodiment of the present disclosure may be divided into a groupcast control information and data transmission step S400 as a first step and a groupcast feedback information transmission step S500 as a second step.

First, in a groupcast control information transmission step S410 of the first step S400, as shown in FIG. 5, the transmitting terminal 310 may transmit groupcast control information to terminals 321 to 323 belonging to the receiving terminal group 320 of the groupcast (S411, S412).

Here, the groupcast control information transmitted by the transmitting terminal 310 may include resource allocation information, modulation order, coding rate, HARQ information, and groupcast identifier (ID) for groupcast data transmission. In addition, the groupcast control information may include multi-antenna transmission related information. Here, the groupcast ID may be an ID of the transmitting terminal 310 or an ID of the receiving terminal group 320. The groupcast control information may be transmitted through a PSCCH in form of sidelink control information (SCI) or transmitted through a PSSCH. The configuration of PSCCH and PSSCH through which the groupcast control information is transmitted will be described later with reference to FIGS. 11 to 13.

Then, in a groupcast data transmission step S420 of the first step S400, as shown in FIG. 5, the transmitting terminal 410 may transmit groupcast data to the terminals 321 and 322 belonging to the receiving terminal group 320 (S421, S422). The data targeted for the plurality of terminals 321 to 323 may include vehicle control information, infotainment information, or audio/video information. Alternatively, the data targeted for the plurality of terminals 321 and 322 may include various V2V messages.

Then, in the second step S500 which is the groupcast feedback information transmission step, as shown in FIG. 6, the plurality of receiving terminals 321, 322 and 323 receiving the control information and data in the first step may transmit feedback information to the transmitting terminal 310 (S501, S511).

Here, the receiving terminal group 320 may be divided into a first subgroup and a second subgroup, and the divided subgroups may transmit feedback information at different times. For example, if the receiving terminal group 320 is composed of three terminals, the first subgroup may be composed of one terminal 321, and the second subgroup may be composed of two terminals 322 and 323. Preferably, the terminals belonging to the first subgroup and the terminals belonging to the second subgroup do not overlap each other, but some of the terminals belonging to the first subgroup and some of the terminals belonging to the second subgroup may overlap each other.

A time point (i.e., first time point) at which at least one terminal (e.g., 321) of the terminals belonging to the first subgroup transmits feedback information may be earlier than a time point at which at least one terminal (e.g., 322) of the terminals belonging to the second subgroup transmits feedback information. Through this, the terminals (e.g., 322) belonging to the second subgroup first receive the feedback information (e.g., first feedback information) transmitted by the terminals (e.g., 321) belonging to the first subgroup, and based thereon, each of the terminals (e.g., 322) belonging to the second subgroup may determine whether to transmit its own feedback information (e.g., second feedback information). For example, the terminal 321 belonging to the first subgroup may transmit the first feedback information at the first time point (S501). On the other hand, the terminal 322 belonging to the second subgroup may first receive the first feedback information, and transmit its own feedback information (i.e., the second feedback information) (S511) or not (S512).

Meanwhile, the feedback information may include HARQ feedback information. The feedback information may also include at least one of channel state information (CSI), power control information (e.g., a transmit power control (TPC) command), link adaptation information, and information on a multiple antenna transmission scheme. In addition, in the second step S500 of the groupcast transmission, the feedback information may be transmitted through a PSCCH, a PSSCH, or a PSFCH. The configuration of the PSCCH and PSSCH through which the feedback information is transmitted will be described later with reference to FIGS. 14 and 15.

The HARQ feedback information may include whether each receiving terminal has successfully demodulated the groupcast data received in the step S420. The CSI may include a channel quality indicator (CQI), a rank indicator (RI), or a precoding matrix indicator (PMI). Meanwhile, the CSI may be calculated in wideband or in units of a subband.

FIG. 6 illustrates a situation in which feedback information is transmitted from all the terminals in the receiving terminal group to the transmitting terminal. However, in the groupcast transmission according to an exemplary embodiment of the present disclosure, as shown in FIG. 7, only one or more terminals (e.g., 321), which are a portion of the receiving terminal group, may transmit the feedback information to the transmitting terminal. That is, by avoiding transmitting the groupcast feedback information more than the number necessary to achieve the groupcast transmission purpose, it is possible to prevent radio resource waste, reduce terminal power consumption, and reduce unnecessary interference.

As one example, when a negative acknowledgment (NACK) is transmitted by a specific receiving terminal of the receiving terminal group (e.g., the terminal 321 of the first subgroup) in the second step S500, the remaining receiving terminals (i.e., the terminal 322 of the second subgroup) in the receiving terminal group may not transmit ACK or NACK. When even one receiving terminal transmits a NACK feedback, the transmitting terminal may not need HARQ feedback information of the remaining terminals because the transmitting terminal should perform retransmission of the groupcast data for the entire group.

As another example, when a CQI is included as the CSI in the feedback information of the second step S500, and the CQI is transmitted by a specific receiving terminal (i.e., the terminal 321 of the first subgroup) of the receiving terminal group, the remaining receiving terminals (i.e., the terminal 322 of the second subgroup) in the receiving terminal group may receive the CQI transmitted by the specific receiving terminal. Thereafter, each of the remaining receiving terminals may compare the received CQI with a CQI to be transmitted by itself. If the received CQI is lower than the CQI to be transmitted (i.e., when a modulation and coding scheme (MCS) indicated by the received CQI is lower than an MCS indicated by the CQI to be transmitted), or if the same MCS is indicated by the received CQI and the CQI to be transmitted, each of the remaining receiving terminals may not transmit the CQI (i.e., its own CQI). On the other hand, if the received CQI indicates an MCS higher than the MCS indicated by the CQI to be transmitted, the receiving terminal may transmit its CQI. The transmitting terminal 310 should receive the CQIs from the receiving terminals in the receiving terminal group, and determine the link adaptation, scheduling, and multi-antenna transmission scheme in consideration of the lowest CQI among the received CQIs. In this reason, there is no need to receive a higher CQI.

As yet another example, when an RI is included as the CSI in the feedback information of the second step S500, and the RI is transmitted by a specific receiving terminal (i.e., the terminal 321 of the first subgroup) of the receiving terminal group, the remaining receiving terminals (i.e., the terminal 322 of the second subgroup) in the receiving terminal group may receive the RI transmitted by the specific receiving terminal. Thereafter, each of the remaining receiving terminals may compare the received RI with an RI to be transmitted by itself. If the received RI value is lower than or equal to the RI to be transmitted, each of the remaining receiving terminals may not transmit its own RI. On the other hand, if the received RI is higher than the RI to be transmitted, the receiving terminal may transmit its RI. The transmitting terminal 310 should receive the RIs from the receiving terminals in the receiving terminal group, and determine the multi-antenna transmission scheme such as the number of layers in consideration of the lowest RI among the received RIs. In this reason, there is no need to receive a higher RI.

As yet another example, when a TPC command is included in the feedback information of the second step S500, and the TPC instructing to increase a transmission power is transmitted by a specific receiving terminal (i.e., the terminal 321 of the first subgroup) of the receiving terminal group, the remaining receiving terminals may not transmit a TPC command. In case of groupcast transmission, the TPC command instructing to increase the transmission power should take precedence over a TPC command instructing to decrease or maintain the transmission power because demodulation of a receiving terminal having the smallest reception power (or, the largest path loss) among the receiving terminals in the receiving terminal group should be possible.

Meanwhile, in order to limit the number of terminals transmitting feedback information as described above, each receiving terminal of the receiving terminal group may receive and demodulate feedback information (i.e., first feedback information) that another receiving terminal transmits first. To this end, it is necessary to inform the receiving terminals of the frequency and time domain location of the radio resource through which the first feedback information is transmitted.

The frequency and time domain location information of the corresponding radio resource (i.e., first feedback resource) may be included in the groupcast control information from the transmitting terminal in the first step (S411) of groupcast transmission and transmitted to each receiving terminal of the receiving terminal group. In this case, the groupcast control information may be transmitted to each receiving terminal in form of sidelink control information (SCI). Alternatively, the groupcast control information may be transmitted in form of a DCI by a serving base station of the receiving terminals. In this case, the serving base station of the receiving terminals may be the same as the serving base station of the transmitting terminal. However, although the serving base station of the receiving terminals may be different from the serving base station of the transmitting terminal, both serving base stations may be connected through an X2 interface to mutually determine or share the control information.

On the other hand, the frequency and time domain location of the radio resource (i.e., first feedback resource) through which the first feedback information is transmitted may be determined according to a rule predefined in a standard specification without being signaled from the transmitting terminal or the serving base station. For example, when the groupcast data or the groupcast control information is transmitted, the predefined rule may be applied to derive the frequency and time domain location of the radio resource (i.e., first feedback resource) through which the first feedback information is transmitted.

In the second step of the groupcast transmission, the receiving terminals (i.e., terminals 322 and 323 belonging to the second subgroup) of the receiving terminal group may receive a signal including the first feedback information, which is transmitted by different receiving terminals (e.g., the terminal 321 belonging to the first subgroup). In this case, information on a scrambling sequence or a demodulation reference signal (DM-RS) sequence required for demodulating the first feedback information may be provided to the terminals belonging to the second subgroup in advance by the transmitting terminal or the serving base station. That is, the information on the sequence may be provided to the receiving terminals belonging to the second subgroup by the transmitting terminal through a PSCCH or a PSSCH, or may be provided to the receiving terminals belonging to the second subgroup by the serving base station through a DCI. Alternatively, a common group ID shared by the terminals of the receiving terminal group may be applied as an initialization ID for the scrambling sequence ID or the DM-RS sequence.

As another example of a method for transmitting information on the frequency and time domain location of the radio resource (i.e., first feedback resource) to limit the number of terminals transmitting the groupcast feedback information, the serving base station may transmit the information on the frequency and time domain location of the radio resource to the receiving terminals included in the receiving terminal group. The DCI may include a group ID indicating the receiving terminal group. The DCI may be transmitted as included in a physical downlink control channel (PDCCH), and may be applied as an initialization ID for a DM-RS for demodulating the corresponding PDCCH.

Hereinafter, the groupcast transmission methods according to the exemplary embodiments of the present disclosure described with reference to FIGS. 4 and 5 to 7 will be described in terms of operations of a transmitting terminal, a receiving terminal, and a base station, respectively.

Operation of a Transmitting Terminal

Figure 8:
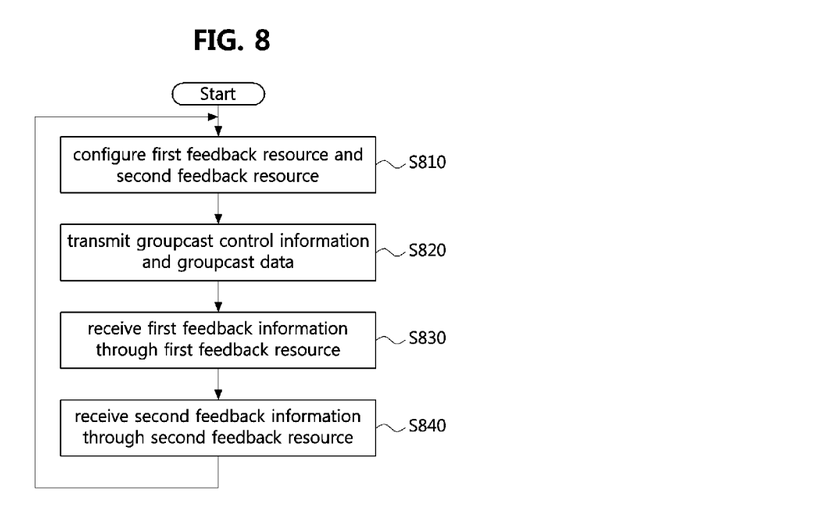
FIG. 8 is a flowchart illustrating a groupcast transmission method according to an exemplary embodiment of the present disclosure performed by a transmitting terminal.

FIG. 8 is a flowchart illustrating a groupcast transmission method according to an exemplary embodiment of the present disclosure performed by a transmitting terminal.

Referring to FIG. 8, a sidelink groupcast transmission method performed by a transmitting terminal may comprise a step S810 of configuring a first feedback resource located at a first time point and a second feedback resource located at a later time point than the first time point; a step S820 of transmitting groupcast control information and groupcast data to a receiving terminal group; a step S830 of receiving first feedback information through the first feedback resource from at least one terminal belonging to a first subgroup of the receiving terminal group; and a step S840 of receiving second feedback information through the second feedback resource from at least one terminal belonging to a second subgroup of the receiving terminal group.

Specifically, in the step S810, the second time point at which the second feedback resource is located may be later than the first time point at which the first feedback resource is located. That is, the first feedback resource and the second feedback resource are located at different points of time, and the first feedback resource may be located at an earlier time point than the second feedback resource by a predetermined number of symbols, mini-slots, slots, or subframes.

Meanwhile, information on the first feedback resource and the second feedback resource configured in the step S810 may be transmitted to the terminals belonging to the first subgroup or the second subgroup as included in groupcast control information (S820). That is, the information on the first feedback resource and the second feedback resource may be transmitted through a PSCCH. Alternatively, the information on the first feedback resource and the second feedback resource may be transmitted through a PSSCH. Alternatively, the information on the first feedback resource and the second feedback resource may be transmitted through a DCI from a serving base station of the terminals belonging to the first subgroup or the second subgroup.

Each of the terminals belonging to the second subgroup may first receive the first feedback information transmitted by the terminal belonging to the first subgroup, and may determine whether to transmit its own feedback information (i.e., the second feedback information) based on the received first feedback information. That is, only terminals satisfying a predetermined condition among the terminals belonging to the second subgroup may transmit the second feedback information.

In this case, information on a scrambling sequence or a DM-RS sequence required for demodulating the first feedback information may be provided by the transmitting terminal to the terminals belonging to the second subgroup in advance through a PSCCH or a PSSCH, or may be provided by a serving base station of the terminals belonging to the second subgroup to the terminals belonging to the second subgroup in advance through a DCI. Alternatively, the scrambling sequence ID or the DM-RS sequence may be derived from a group ID which is commonly applied to the terminals of the receiving terminal group.

Meanwhile, whether to transmit the feedback information at each of the receiving terminals belonging to the second subgroup may be determined by the following conditions.

For example, when the first feedback information includes a NACK, a receiving terminal to transmit an ACK or a NACK may not transmit the second feedback information through the second feedback resource. Also, when the first feedback information includes a CQI, a receiving terminal to transmit a CQI indicating an MCS having a higher or equal level than an MCS indicated by the CQI included in the received first feedback information may not transmit the second feedback information through the second feedback resource.

For example, when the first feedback information includes an RI, a receiving terminal to transmit an RI having a higher or equal level than the RI included in the received first feedback information may not transmit the second feedback information through the second feedback resource. Also, when the first feedback information includes a TPC command instructing to increase a transmission power, a receiving terminal to transmit a TPC command instructing to decrease or maintain the transmission power may not transmit the second feedback information through the second feedback resource.

Operations of a Receiving Terminal

Figure 9:
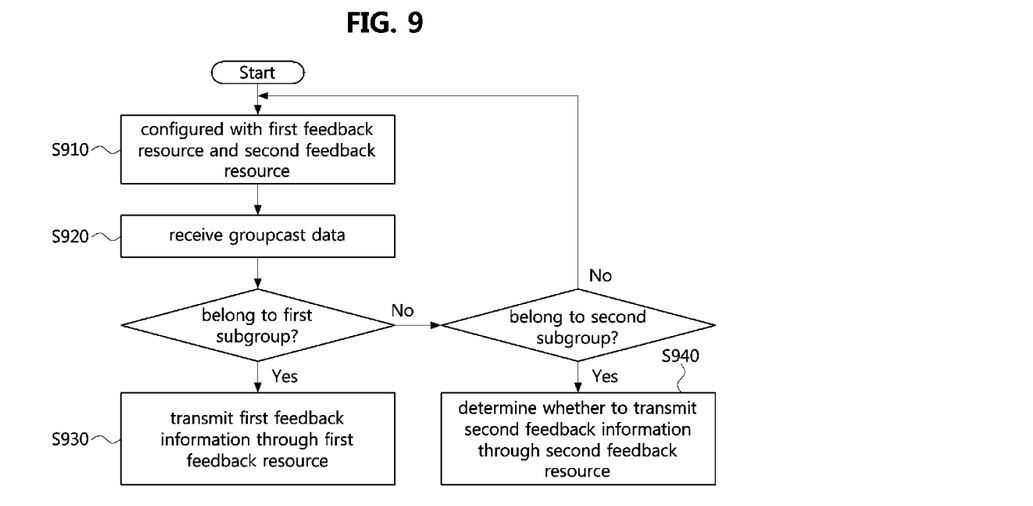
FIG. 9 is a flowchart illustrating a groupcast reception method according to an exemplary embodiment of the present disclosure performed by a receiving terminal.

FIG. 9 is a flowchart illustrating a groupcast reception method according to an exemplary embodiment of the present disclosure performed by a receiving terminal.

Referring to FIG. 9, a sidelink groupcast reception method performed by a receiving terminal may comprise a step S910 of being configured with a first feedback resource located at a first time point and a second feedback resource located at a later time point than the first time point, the first feedback resource being for transmitting first feedback information and the second feedback resource being for transmitting second feedback information; a step S920 of receiving groupcast data from a transmitting terminal; a step S930 of transmitting the first feedback information on the groupcast data through the first feedback resource in response to determining that the receiving terminal belongs to a first subgroup of a receiving terminal group; and a step S940 of receiving the first feedback information transmitted by at least one terminal belonging to the first subgroup and determining whether to transmit the second feedback information on the groupcast data through the second feedback resource based on the received first feedback information in response to determining that the receiving terminal belongs to a second subgroup of the receiving terminal group.

Specifically, in the step S910, the second time point at which the second feedback resource is located may be later than the first time point at which the first feedback resource is located. That is, the first feedback resource and the second feedback resource are located at different points of time, and the first feedback resource may be located at an earlier time point than the second feedback resource by a predetermined number of symbols, mini-slots, slots, or subframes.

Information on the first feedback resource may be received from the transmitting terminal through a PSCCH or a PSSCH, or may be received from a serving base station through a DCI.

When the receiving terminal belongs to the first subgroup, the receiving terminal may transmit the first feedback information at the first time point ahead of the terminals belonging to the second subgroup (S930). On the other hand, when the receiving terminal belongs to the second subgroup, the receiving terminal may determine whether to transmit its own feedback information (i.e., the second feedback information) based on the received first feedback information. That is, only terminals satisfying a predetermined condition among the terminals belonging to the second subgroup may transmit the second feedback information.

In this case, information on a scrambling sequence or a DM-RS sequence required for demodulating the first feedback information may be provided to the terminals belonging to the second subgroup in advance by the transmitting terminal through a PSCCH or a PSSCH, or may be provided to the terminals belonging to the second subgroup in advance by a serving base station of the terminals belonging to the second subgroup through a DCI. Alternatively, the scrambling sequence ID or the DM-RS sequence may be derived from a group ID which is commonly applied to the terminals of the receiving terminal group.

Meanwhile, whether to transmit the feedback information at each of the receiving terminals belonging to the second subgroup may be determined by the following conditions.

For example, when the first feedback information includes a NACK, a receiving terminal to transmit an ACK or a NACK may not transmit the second feedback information through the second feedback resource. Also, when the first feedback information includes a CQI, a receiving terminal to transmit a CQI indicating an MCS having a higher or equal level than an MCS indicated by the CQI included in the received first feedback information may not transmit the second feedback information through the second feedback resource.

For example, when the first feedback information includes an RI, a receiving terminal to transmit an RI having a higher or equal level than the RI included in the received first feedback information may not transmit the second feedback information through the second feedback resource. Also, when the first feedback information includes a TPC command instructing to increase a transmission power, a receiving terminal to transmit a TPC command instructing to decrease or maintain the transmission power may not transmit the second feedback information through the second feedback resource.

Operations of a Base Station

Figure 10:
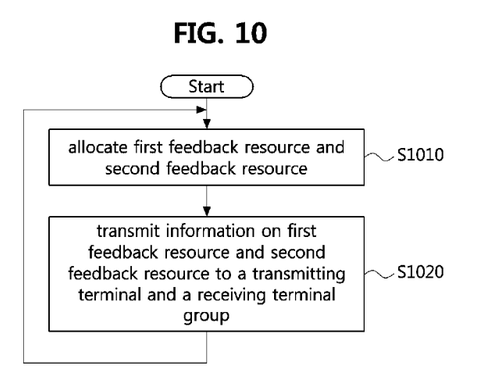
FIG. 10 is a flowchart illustrating a groupcast supporting method according to an exemplary embodiment of the present disclosure performed by a base station.

FIG. 10 is a flowchart illustrating a groupcast supporting method according to an exemplary embodiment of the present disclosure performed by a base station.

Referring to FIG. 10, a method for supporting sidelink groupcast performed by a base station may comprise a step S1010 of allocating a first feedback resource located at a first time point and a second feedback resource located at a later time point than the first time point; and a step S1020 of transmitting information on the first feedback resource and information on the second feedback resource to at least one of a transmitting terminal for groupcast transmission and at least one receiving terminal belonging to a receiving terminal group of the groupcast transmission.

Specifically, in the step S1010, the second time point at which the second feedback resource is located may be later than the first time point at which the first feedback resource is located. That is, the first feedback resource and the second feedback resource are located at different points of time, and the first feedback resource may be located at an earlier time point than the second feedback resource by a predetermined number of symbols, mini-slots, slots, or subframes. In the step S1020, the information on the first feedback resource and the information on the second feedback resource may be transmitted from the base station to at least one of the transmitting terminal and at least one receiving terminal belonging to the receiving terminal group through a DCI.

Here, the first feedback resource may be allocated to a first subgroup of the receiving terminal group, and the second feedback resource may be allocated to a second subgroup of the receiving terminal group.

Also, at least one terminal belonging to the first subgroup may transmit first feedback information to the transmitting terminal through the first feedback resource, and at least one terminal belonging to the second subgroup may transmit second feedback information to the transmitting terminal through the second feedback resource.

Also, each of the terminals belonging to the second subgroup may first receive the first feedback information transmitted by the terminal belonging to the first subgroup, and may determine whether to transmit its own feedback information (i.e., the second feedback information) based on the first feedback information. That is, only terminals satisfying a predetermined condition among the terminals belonging to the second subgroup may transmit the second feedback information.

In this case, information on a scrambling sequence or a DM-RS sequence required for demodulating the first feedback information may be transmitted by the base station to the terminals belonging to the second subgroup through a DCI.

PSCCH/PSSCH Multiplexing Scheme

In order to multiplex the PSCCH and PSSCH through which the groupcast control information and groupcast data are transmitted and the PSCCH and PSSCH through which the feedback information on the groupcast data are transmitted, a time division multiplexing (TDM) scheme, a frequency division multiplexing (FDM) scheme, or the like may be applied.

Figure 11:
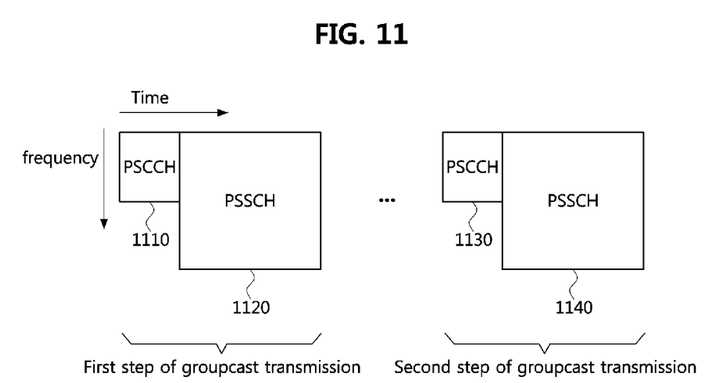
FIG. 11 is a conceptual diagram illustrating time division multiplexing of PSCCH/PSCCH according to an exemplary embodiment of the present disclosure.

FIG. 11 is a conceptual diagram illustrating time division multiplexing of PSCCH/PSCCH according to an exemplary embodiment of the present disclosure.

Referring to FIG. 11, PSCCH and PSSCH transmitted in the first step of groupcast transmission (e.g., S400 of FIG. 4) may be time division multiplexed. Also, PSCCH and PSSCH transmitted in the second step of groupcast transmission (e.g., S500 of FIG. 4) may be time division multiplexed.

A PSCCH 1110 of the first step of groupcast transmission may include information (i.e., PSSCH scheduling information) indicating a resource through which the groupcast data is transmitted and information on transmission resources of feedback information (i.e., the first feedback resource and the second feedback resource). A PSSCH 1120 of the first step of groupcast transmission may include the groupcast data scheduled by the PSCCH 1110.

Meanwhile, in a PSCCH 1130 of the second step of groupcast transmission, feedback information on the groupcast data transmitted through the PSSCH 1120 may be transmitted. In addition, the feedback information on the groupcast data transmitted through the PSSCH 1120 may be transmitted not only through the PSCCH 1130 but also through a PSSCH 1140.

Further, the PSCCH 1130 and the PSSCH 1140 may be used not only for transmitting feedback information for the PSSCH 1120 but also for transmitting sidelink data different from the groupcast data transmitted through the PSSCH 1120. That is, the PSCCH 1130 may include information for scheduling the PSSCH 1140, and the PSSCH 1140 scheduled by the PSCCH 1130 may include data.

Figure 12:
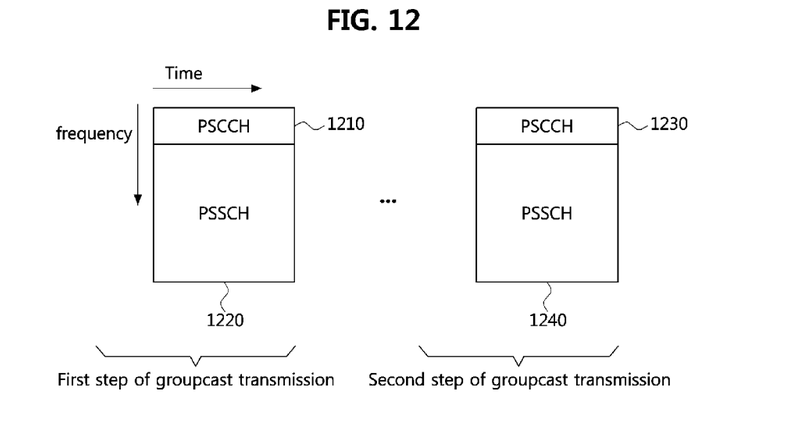
FIG. 12 is a conceptual diagram illustrating frequency division multiplexing of PSCCH/PSCCH according to an exemplary embodiment of the present disclosure.

FIG. 12 is a conceptual diagram illustrating frequency division multiplexing of PSCCH/PSCCH according to an exemplary embodiment of the present disclosure.

Referring to FIG. 12, PSCCH and PSSCH transmitted in the first step of groupcast transmission (e.g., S400 of FIG. 4) may be frequency division multiplexed. Also, PSCCH and PSSCH transmitted in the second step of groupcast transmission (e.g., S500 of FIG. 4) may be frequency division multiplexed.

A PSCCH 1210 of the first step of groupcast transmission may include information (i.e., PSSCH scheduling information) indicating a resource through which the groupcast data is transmitted and information on transmission resources of feedback information (i.e., the first feedback resource and the second feedback resource). A PSSCH 1220 of the first step of groupcast transmission may include the groupcast data scheduled by the PSCCH 1210.

Meanwhile, in a PSCCH 1230 of the second step of groupcast transmission, feedback information on the groupcast data transmitted through the PSSCH 1220 may be transmitted. In addition, the feedback information on the groupcast data transmitted through the PSSCH 1220 may be transmitted not only through the PSCCH 1230 but also through a PSSCH 1240.

Further, the PSCCH 1230 and the PSSCH 1240 may be used not only for transmitting feedback information for the PSSCH 1220 but also for transmitting sidelink data different from the groupcast data transmitted through the PSSCH 1220. That is, the PSCCH 1230 may include information for scheduling the PSSCH 1240, and the PSSCH 1240 scheduled by the PSCCH 1230 may include data.

Figure 13:
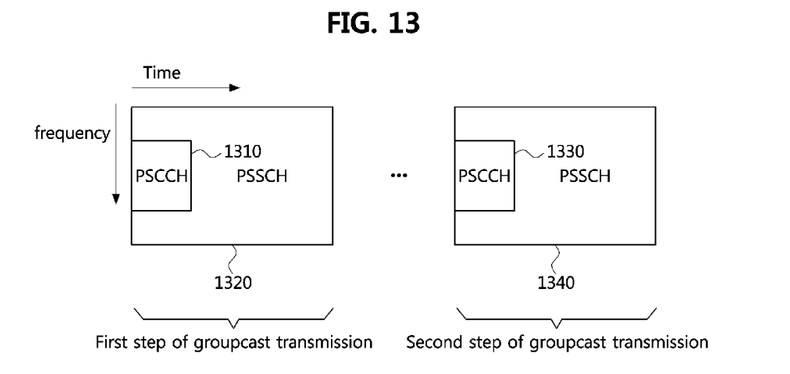
FIG. 13 is a conceptual diagram illustrating time-frequency division multiplexing of PSCCH/PSCCH according to an exemplary embodiment of the present disclosure.

FIG. 13 is a conceptual diagram illustrating time-frequency division multiplexing of PSCCH/PSCCH according to an exemplary embodiment of the present disclosure.

Meanwhile, time-frequency division multiplexing into which the TDM scheme of FIG. 11 and the FDM scheme of FIG. 12 are combined may be applied for multiplexing PSCCH and PSSCH.

Referring to FIG. 13, a PSCCH 1310 transmitted in the first step of groupcast transmission (e.g., S400 of FIG. 4) may be located in a front portion of a resource region through a PSSCH 1320 is transmitted in the time axis, and may be located in a center of a frequency band occupied by the PSSCH 1320. That is, the front portion of the PSSCH 1320 may be frequency division multiplexed with the PSCCH 1310, and the rear portion of the PSCCH 1320 may be time division multiplexed with the PSCCH 1310. Similarly, a PSCCH 1330 transmitted in the second step of groupcast transmission (e.g., S500 of FIG. 4) may be located in a front portion of a resource region through a PSSCH 1340 is transmitted in the time axis, and may be located in a center of a frequency band occupied by the PSSCH 1340. That is, the front portion of the PSSCH 1340 may be frequency division multiplexed with the PSCCH 1330, and the rear portion of the PSSCH 1340 may be time division multiplexed with the PSCCH 1330.

The PSCCH 1310 of the first step of groupcast transmission may include information (i.e., PSSCH scheduling information) indicating a resource through which the groupcast data is transmitted and information on a transmission resource of feedback information (i.e., the first feedback resource and the second feedback resource). The PSSCH 1320 of the first step of groupcast transmission may include the groupcast data scheduled by the PSCCH 1310.

Meanwhile, in the PSCCH 1330 of the second step of groupcast transmission, feedback information on the groupcast data transmitted through the PSSCH 1320 may be transmitted. In addition, the feedback information on the groupcast data transmitted through the PSSCH 1320 may be transmitted not only through the PSCCH 1330 but also through the PSSCH 1340.

Further, the PSCCH 1330 and the PSSCH 1340 may be used not only for transmitting feedback information for the PSSCH 1320 but also for transmitting sidelink data different from the groupcast data transmitted through the PSSCH 1320. That is, the PSCCH 1330 may include information for scheduling the PSSCH 1340, and the PSSCH 1340 scheduled by the PSCCH 1330 may include data.

Meanwhile, in the second step of groupcast transmission, TDM, FDM, or code division multiplexing (CDM) may be applied as a multiplexing scheme between the feedback information of the first subgroup (i.e., first feedback information) and the feedback information of the second subgroup (i.e., second feedback information).

Figure 14:
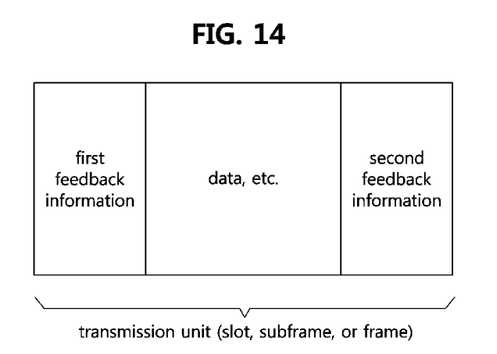
FIG. 14 is a conceptual diagram illustrating a concept of multiplexing feedback information in a TDM scheme according to an exemplary embodiment of the present disclosure.

FIG. 14 is a conceptual diagram illustrating a concept of multiplexing feedback information in a TDM scheme according to an exemplary embodiment of the present disclosure.

Referring to FIG. 14, the first feedback information and the second feedback information may be located at a front portion and a rear portion of a sidelink transmission unit (slot, mini-slot, subframe, or frame), respectively. For example, the first feedback information may exist in a PSCCH region and the second feedback information may exist in a PSSCH region. Alternatively, the first feedback information may exist in a PSFCH region and the second feedback information may exist in the PSFCH region which is located later than the former PSFCH region, respectively. Alternatively, both the first feedback information and the second feedback information may be located in front symbol(s) and rear symbol(s) of the PSCCH region, respectively. Alternatively, both the first feedback information and the second feedback information may be located in front symbol(s) and rear symbol(s) of the PSSCH region, respectively. Alternatively, both the first feedback information and the second feedback information may be located in front symbol(s) and rear symbol(s) of the PSFCH region, respectively.

Meanwhile, the first feedback information and the second feedback information may be located in different sidelink transmission units. For example, when the first feedback information is located in the n-th slot (or subframe, frame, etc.), the second feedback information may be located in the (n+k)-th slot (or subframe, frame, etc.). Here, each of n and k may be a positive integer.

As described above, when the TDM scheme is applied to the first feedback information and the second feedback information, after the terminals of the second subgroup receive and demodulate the first feedback information of the first subgroup, methods for limiting the number of terminals transmitting the groupcast feedback information may be applied.

Figure 15:
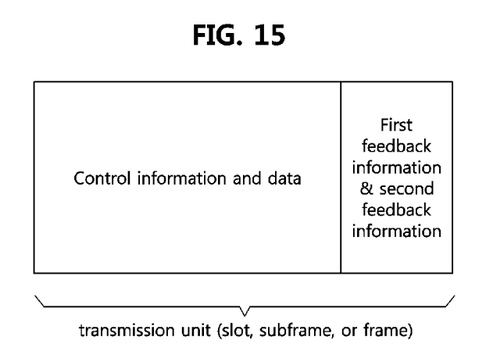
FIG. 15 is a conceptual diagram illustrating a concept of multiplexing feedback information in a CDM scheme according to an exemplary embodiment of the present disclosure.

FIG. 15 is a conceptual diagram illustrating a concept of multiplexing feedback information in a CDM scheme according to an exemplary embodiment of the present disclosure.

Referring to FIG. 15, both the first feedback information and the second feedback information may be located at the rear portion of the sidelink transmission unit. In this case, the first feedback information and the second feedback information may be distinguished from each other by applying different codes. Specifically, cyclic shifts or orthogonal cover codes (OCCs) may be used for the CDM scheme.

Figure 16:
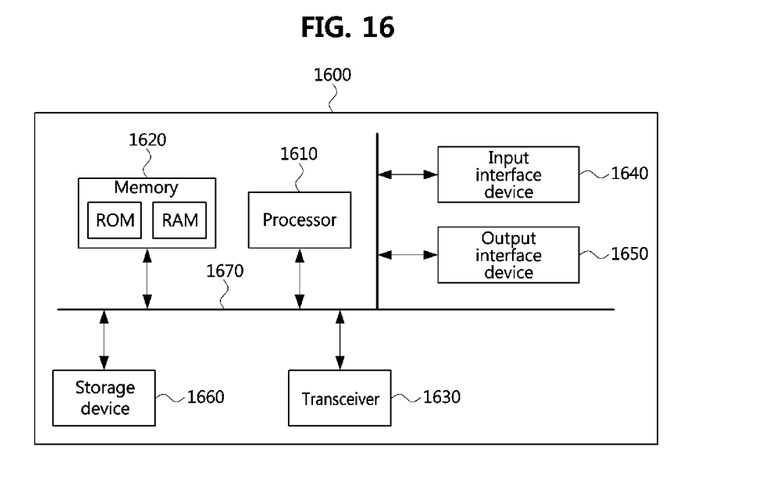
FIG. 16 is a block diagram illustrating a structure of an apparatus to which exemplary embodiments of the present disclosure are be applied.

FIG. 16 is a block diagram illustrating a structure of an apparatus to which exemplary embodiments of the present disclosure are be applied.

Although a general structure applicable to the above-described transmitting terminal and receiving terminal is described in FIG. 16, the same or similar structure may be applied to the above-described base station.

Referring to FIG. 16, a terminal 1600 may include a processor 1610, a memory 1620, and a transceiver 1630 capable of transmitting and receiving data, control information, and feedback information with a base station or a counterpart terminal. Also, the terminal may further include an input interface device 1640, an output interface device 1650, and a storage device 1660. The processor 1610, the memory 1620, the transceiver 1630, and the storage device 1640 may be connected through a bus 1670 to communicate with each other. Also, the processor 1610, the memory 1620, the transceiver 1630, and the storage device 1640 may be directly connected through a dedicated one-to-one interface. For example, the processor 1610 may be connected to at least one of the memory 1620, the transceiver 1630, the input interface device 1640, the output interface device 1650, and the storage device 1660 through a dedicated interface.

The processor 1610 may execute at least one program instruction stored in at least one of the memory 1620 and the storage device 1660. The processor 1610 may refer to a central processing unit (CPU), a graphics processing unit (GPU), or a dedicated processor on which methods according to exemplary embodiments of the present disclosure are performed. Each of the memory 1620 and the storage device 1660 may be configured of at least one of a volatile storage medium and a nonvolatile storage medium. For example, the memory 1620 may be configured as at least one of read only memory (ROM) and random access memory (RAM).

The at least one instruction may be configured such that the processor 1610 performs each step of the groupcast transmission method, the groupcast reception method, or the groupcast support method according to the exemplary embodiments of the present disclosure described above. All messages exchanged between the base station and the terminal or between the transmitting terminal and the receiving terminal may be transmitted or received through the transceiver 1630 under the control of the processor 1610.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for sidelink groupcast transmission, performed by a transmitting terminal, the method comprising:
configuring a first feedback resource located at a first time point and a second feedback resource located at a later time point than the first time point;
transmitting groupcast control information and groupcast data to a receiving terminal group;
receiving first feedback information through the first feedback resource from at least one terminal belonging to a first subgroup of the receiving terminal group; and
receiving second feedback information through the second feedback resource from at least one terminal belonging to a second subgroup of the receiving terminal group,
wherein the at least one terminal transmitting the second feedback information is a portion of terminals belonging to the second subgroup; and
wherein when the first feedback information includes a negative acknowledgement (NACK), a terminal to transmit an ACK or a NACK does not transmit the second feedback information through the second feedback resource.

2. The method according to claim 1, wherein information on the first feedback resource is transmitted from the transmitting terminal to terminals belonging to the first subgroup and the second subgroup through a physical sidelink control channel (PSCCH) or a physical sidelink shared channel (PSSCH), or transmitted from a serving base station of terminals belonging to the first subgroup or the second subgroup to the terminals belonging to the first subgroup and the second subgroup through a downlink control information (DCI).

3. The method according to claim 1, wherein information on a scrambling sequence or a demodulation reference signal (DM-RS) sequence, which is required for demodulating the first feedback information, is transmitted from the transmitting terminal to terminals belonging to the second subgroup through a PSCCH or a PSSCH, or transmitted from a serving base station of the terminals belonging to the first subgroup or the second subgroup to the terminals belonging to the second subgroup through a DCI.

4. The method according to claim 1, wherein when the first feedback information includes a channel quality indicator (CQI), a terminal to transmit a CQI indicating a modulation and coding scheme (MCS) having a higher or equal level than an MCS indicated by the CQI included in the first feedback information does not transmit the second feedback information through the second feedback resource.

5. The method according to claim 1, wherein when the first feedback information includes a rank indicator (RI), a terminal to transmit an RI having a higher or equal level than an RI included in the first feedback information does not transmit the second feedback information through the second feedback resource.

6. The method according to claim 1, wherein when the first feedback information includes a transmit power control (TPC) command instructing to increase a transmission power, a terminal to transmit a TPC command instructing to decrease or maintain the transmission power does not transmit the second feedback information through the second feedback resource.

7. A method for sidelink groupcast reception, performed by a receiving terminal, the method comprising:
- being configured with a first feedback resource located at a first time point and a second feedback resource located at a later time point than the first time point, the first feedback resource being for transmitting first feedback information and the second feedback resource being for transmitting second feedback information;
- receiving groupcast data from a transmitting terminal;
- in response to determining that the receiving terminal belongs to a first subgroup of a receiving terminal group, transmitting the first feedback information on the groupcast data through the first feedback resource; and
- in response to determining that the receiving terminal belongs to a second subgroup of the receiving terminal group, receiving the first feedback information transmitted by at least one terminal belonging to the first subgroup, and determining whether to transmit the second feedback information on the groupcast data through the second feedback resource based on the received first feedback information,
- wherein when the received first feedback information includes a negative acknowledgement (NACK), and the receiving terminal belongs to the second subgroup and is to transmit an ACK or a NACK, the receiving terminal does not transmit the second feedback information through the second feedback resource.

8. The method according to claim 7, wherein information on the first feedback resource is received from the transmitting terminal through a physical sidelink control channel (PSCCH) or a physical sidelink shared channel (PSSCH), or received from a serving base station through a downlink control information (DCI).

9. The method according to claim 7, wherein information on a scrambling sequence or a demodulation reference signal (DM-RS) sequence, which is required for demodulating the first feedback information, is received from the transmitting terminal through a PSCCH or a PSSCH, or received from a serving base station through a DCI.

10. The method according to claim 7, wherein when the received first feedback information includes a channel quality indicator (CQI), and the receiving terminal belongs to the second subgroup and is to transmit a CQI indicating a modulation and coding scheme (MCS) having a higher or equal level than an MCS indicated by the CQI included in the received first feedback information, the receiving terminal does not transmit the second feedback information through the second feedback resource.

11. The method according to claim 7, wherein when the received first feedback information includes a rank indicator (RI), and the receiving terminal belongs to the second subgroup and is to transmit an RI having a higher or equal level than an RI included in the received first feedback information, the receiving terminal does not transmit the second feedback information through the second feedback resource.

12. The method according to claim 7, wherein when the received first feedback information includes a transmit power control (TPC) command instructing to increase a transmission power, and the receiving terminal belongs to the second subgroup and is to transmit a TPC instructing to decrease or maintain the transmission power, the receiving terminal does not transmit the second feedback information through the second feedback resource.

* * * * *